(12) United States Patent
Hsu et al.

(10) Patent No.: US 7,929,073 B2
(45) Date of Patent: Apr. 19, 2011

(54) LIQUID CRYSTAL DISPLAY MODULE AND METHOD FOR ASSEMBLING THE SAME

(75) Inventors: Ming-Fu Hsu, Taipei Hsien (TW); Rui Zhou, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 367 days.

(21) Appl. No.: 12/178,651

(22) Filed: Jul. 24, 2008

(65) Prior Publication Data

US 2009/0231509 A1    Sep. 17, 2009

(30) Foreign Application Priority Data

Mar. 12, 2008  (CN) .......................... 2008 1 0300531

(51) Int. Cl.
  *G02F 1/1333*  (2006.01)
  *G02F 1/1335*  (2006.01)
  *F21V 7/04*  (2006.01)
(52) U.S. Cl. .............. 349/58; 349/60; 349/65; 362/632; 362/633; 362/634

(58) Field of Classification Search ................... 349/58, 349/60, 65; 362/632–634
See application file for complete search history.

(56) References Cited

U.S. PATENT DOCUMENTS

| 6,956,637 B2 * | 10/2005 | Satonaka ...................... 349/187 |
| 7,257,306 B2 * | 8/2007 | Sakurai et al. ................ 385/147 |
| 7,760,289 B2 * | 7/2010 | Nakanishi et al. .............. 349/60 |

* cited by examiner

*Primary Examiner* — Wen-Ying P Chen
(74) *Attorney, Agent, or Firm* — Zhigang Ma

(57) ABSTRACT

An exemplary liquid crystal display module includes a liquid crystal display panel, a backlight unit, a bottom frame, and an upper frame. The backlight unit is positioned on the bottom frame. The upper frame is assembled on the bottom frame to fix the backlight unit in position. The upper frame includes four sidewalls, a top flange extending from the four sidewalls towards a center of the upper frame, and a plurality of supporting members defined at the inner surfaces of the sidewalls adjacent to the top flange. At least one of the supporting members is resilient. The liquid crystal display panel is held in place between the top flange and the supporting members. A method for assembling the liquid crystal display module is also provided.

15 Claims, 7 Drawing Sheets

LIQUID CRYSTAL DISPLAY MODULE AND METHOD FOR ASSEMBLING THE SAME

BACKGROUND

1. Field of the Invention

The present invention relates to a liquid crystal display module (LCM) that may be easily assembled and a method for assembling the LCM.

2. Discussion of the Related Art

Uses for an LCM have gradually increased due to its light weight, thinness, and low power consumption. LCMs have wide applications including office automation and audio/video devices. The LCM operates by adjusting transmittance quantities of light in accordance with image signals applied to a matrix of control switches, in order to display desired pictures on a screen. That is, the LCM is not a spontaneous light-emitting display device. The LCM typically needs an accompanying backlight unit as a light source. There are two types of backlight units for the LCM, i.e., a direct-lighting type LCM and an edge-lighting type LCM.

Typically, an edge-lighting type LCM includes a liquid crystal display panel, a backlight unit, a bottom frame, an upper frame, and an outer protecting frame. The upper frame is attached to the bottom frame defining a chamber for receiving the backlight unit. The liquid crystal display panel is supported at the top of the upper frame and covers the backlight unit. The backlight unit usually includes light sources such as cold cathode fluorescent lamps, a light guide plate, and a plurality of optical elements such as a light reflective sheet, a light diffusion film, and a prism sheet. One edge of the liquid crystal display panel is electrically connected to a flexible printed circuit that may be curved to connect with a printed circuit board positioned under the bottom frame.

The LCM is assembled by fixing the light sources to the sides of the bottom frame. The reflective sheet, the light guide plate, the light diffusion film, and the prism sheet are positioned at the base of the bottom frame in order, with the light sources facing the light guide plate. The upper frame is attached to the bottom frame to secure the backlight unit. Then, the liquid crystal display panel is placed on the upper frame to avoid contact with the light diffusion film, the flexible printed circuit is wrapped along a side of the upper frame, and the printed circuit board is positioned under the bottom frame. Finally, the outer protecting frame is mounted on the liquid crystal display panel and fixed with the printed circuit board and the bottom frame tightly.

Under this process, the liquid crystal display panel can easily shift before assembling the outer protecting frame. Much care and high precision are required to assemble the outer protecting frame. The process involves the risk of damaging or scratching the liquid crystal display panel. Thus assembly of the LCM can be unduly complicated, troublesome, and costly.

Therefore, an improved LCM and method for assembling the LCM are desired to overcome the above-described deficiencies.

SUMMARY

An LCM according to an exemplary embodiment includes a liquid crystal display panel, a backlight unit positioned on a bottom frame, and an upper frame attaching to the bottom frame to secure the backlight unit. The upper frame includes four sidewalls, a top flange extending from the sidewalls towards the center of the upper frame, and a plurality of supporting members defined at the inner surface of the sidewalls adjacent to the top flange, in which one of the supporting members is resilient. The liquid crystal display panel is fixed between the top flange and the supporting members.

In another aspect, a method for assembling an LCM according to another exemplary embodiment includes: providing a backlight unit, a liquid crystal display panel, a bottom frame, and an upper frame, the upper frame including a plurality of sidewalls, a top flange extending around from at least a part of a top of at least two opposite sidewalls towards a center of the upper frame, and a plurality of supporting members defined at inner surfaces of the sidewalls adjacent to the top flange; fixing the backlight unit on the bottom frame; pressing the liquid crystal display panel into the space between the top flange and the supporting elements of the upper frame from a side of the supporting members; and mounting the upper frame with the liquid crystal display panel onto the bottom frame and fixing the backlight unit. When assembling the liquid crystal display panel to the upper frame, the liquid crystal display panel is not easily damaged or scratched. In addition, compared to the outer protecting frame of a conventional LCM, the materials of the present exemplary LCM costs less. Thus, the method of assembling the LCM is uncomplicated and inexpensive.

Other novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout several views.

DETAILED DESCRIPTION

Reference will now be made to the drawings to describe preferred and exemplary embodiments of the present invention in detail.

Figure 1:
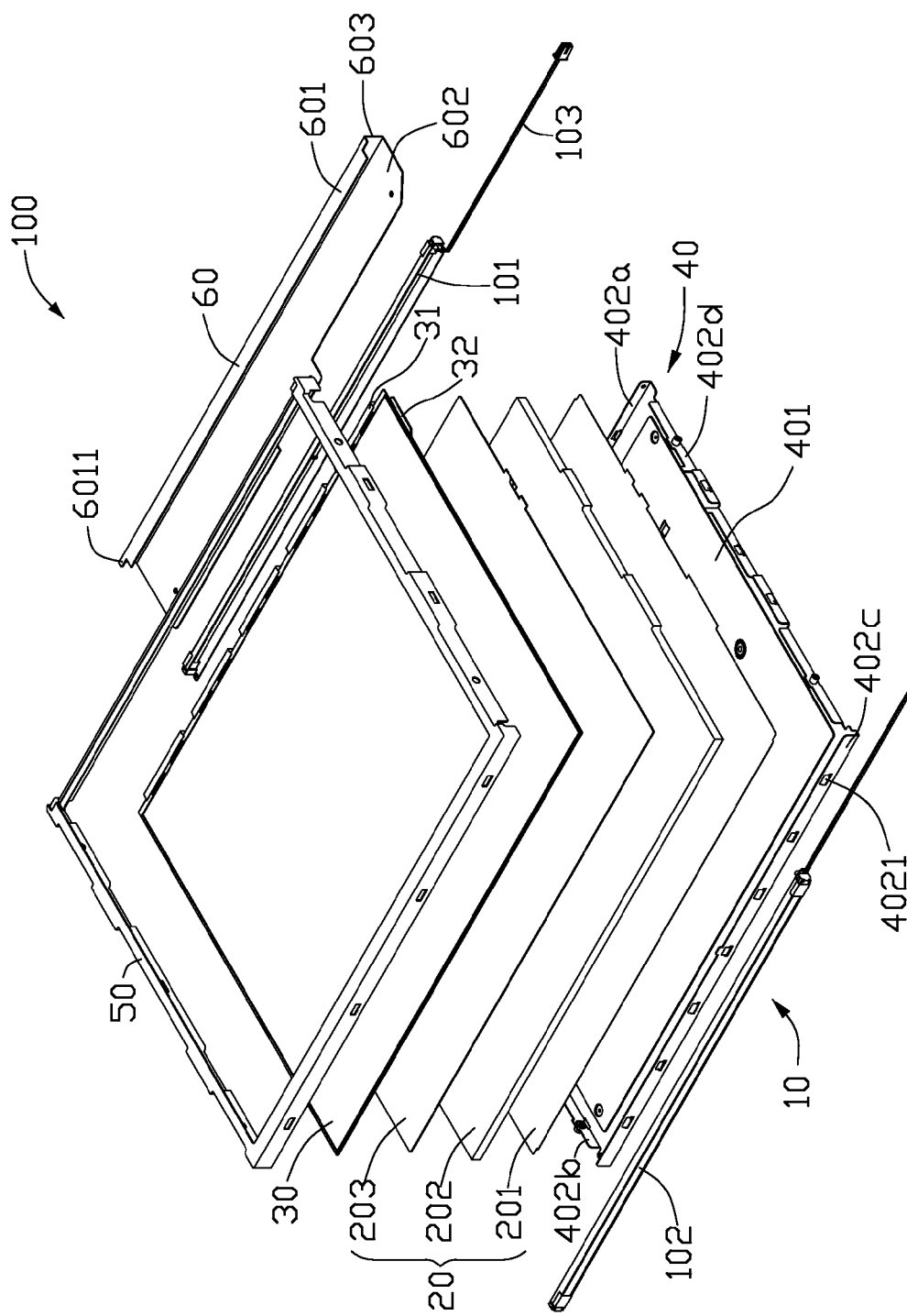
FIG. 1 is an exploded, isometric view of an LCM according to an exemplary embodiment of the present invention.

Referring to FIG. 1, and edge-lighting type LCM 100 according to an exemplary embodiment of the present invention is shown. The LCM 100 includes a liquid crystal display panel 30, a bottom frame 40, an upper frame 50, and a backlight unit (not labeled). The backlight unit includes two light source units 10 and optical elements 20. In other embodiments, there may be only one optical element 20.

The bottom frame 40 includes a base 401, and four sidewalls 402a, 402b, 402c, 402d extending from four edges of the base 401. The four sidewalls 402a, 402b, 402c, 402d are spaced apart from each other at corners (not labeled) of the bottom frame 40. A plurality of locking elements 4021 are formed at outer surfaces of the two sidewalls 402a, 402c that are on opposite sides of the bottom frame 40. Typically, the bottom frame 40 is manufactured by punching a metal sheet.

Each of the two light source units 10 includes a cold cathode fluorescent lamp (CCFL) 101, a reflector 102, and a lead wire 103. The reflector 102 is substantially C-shaped, and partially surrounds the CCFL 101. An end of the lead wire 103 is electrically connected to an electrode of the CCFL 101.

The optical elements 20 include a light reflective sheet 201, a light guide plate 202, and an optical film 203. The light reflective sheet 201, the light guide plate 202, and the optical film 203 are positioned on the base 401 of the bottom frame 40 in that order. The two light source units 10 are positioned between the light guide plate 202 and the two opposite sidewalls 402a, 402c. The CCFL 101 directly faces the light guide plate 202. The light guide plate 202 converts a linear light source (i.e., the CCFL 101) into a surface light source. The light reflective sheet 201 reflects light back into the light guide plate 202. The optical film 203 such as a light diffusion sheet or prism sheet diffuses emitted light, thereby mitigating or eliminating any bright sections that may occur on the light guide plate 202.

One edge (not labeled) of the liquid crystal display panel 30 is electrically connected to a flexible printed circuit 31. The flexible printed circuit 31 may be slightly bent to connect to a printed circuit board 32 that is positioned under the bottom frame 40.

Figure 2:
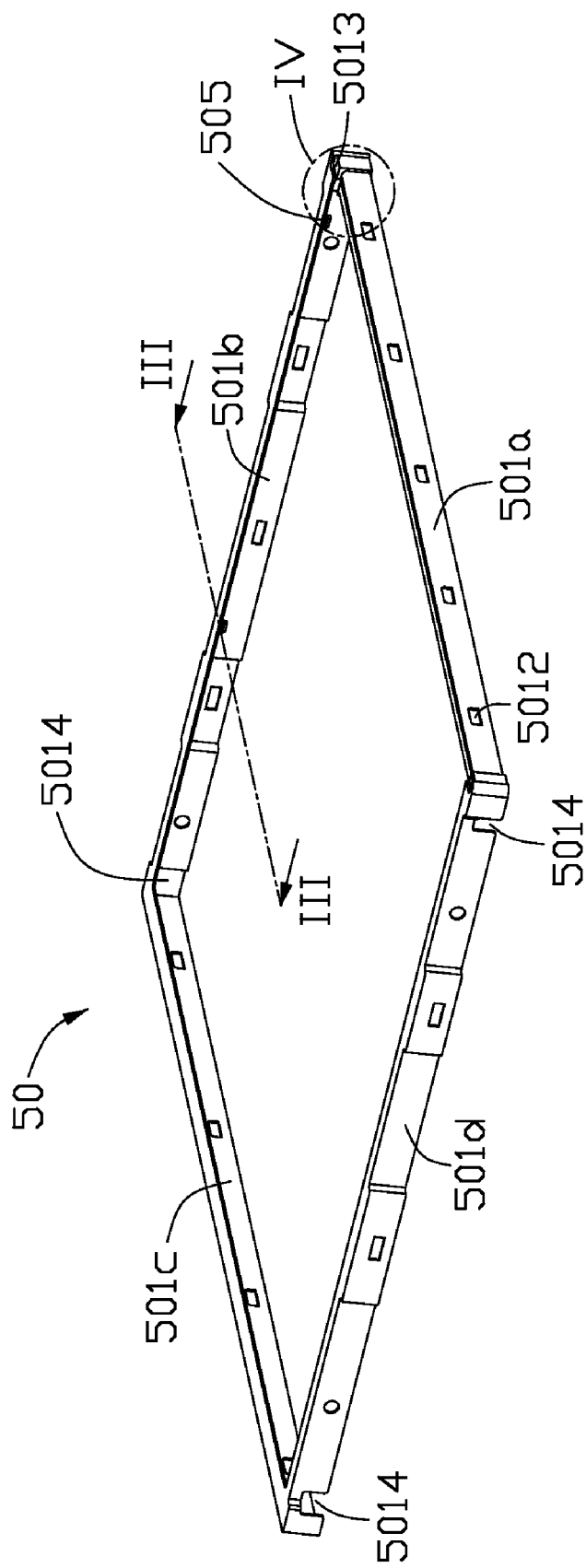
FIG. 2 is an isometric view of an upper frame of the LCM of FIG. 1 rotated clockwise 90 degrees.
Figure 3:
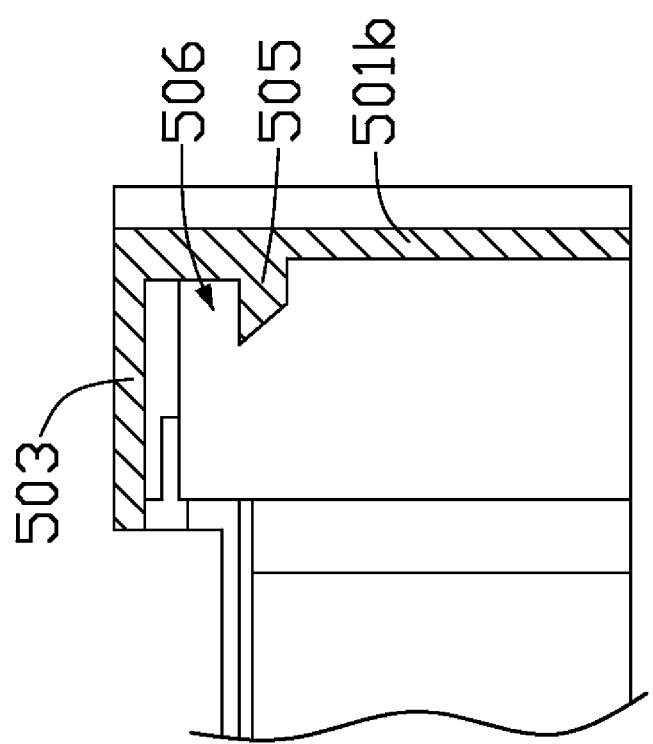
FIG. 3 is a partial, cross-sectional view of the frame of FIG. 2, taken along a line III-III thereof.
Figure 4:
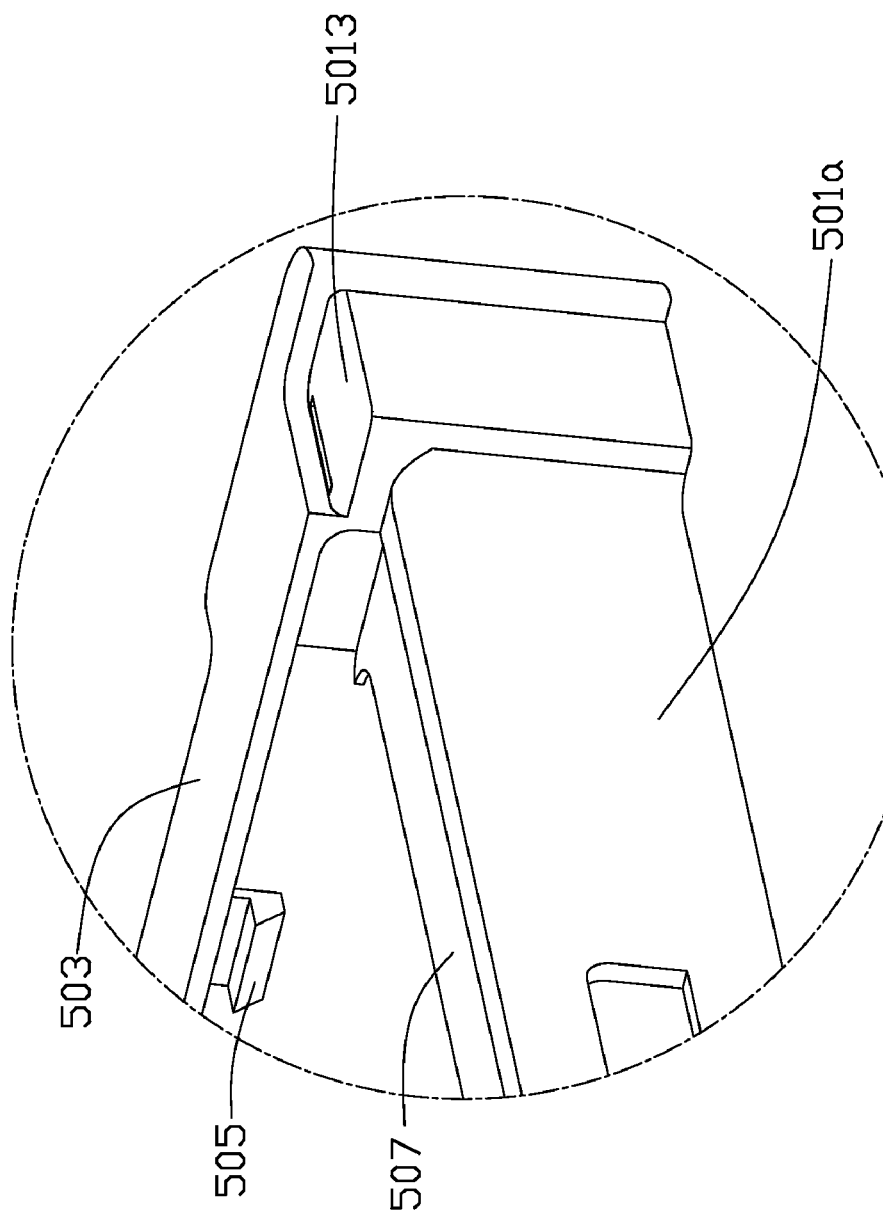
FIG. 4 is an enlarged view of a circled portion IV of FIG. 2.
Figure 5:
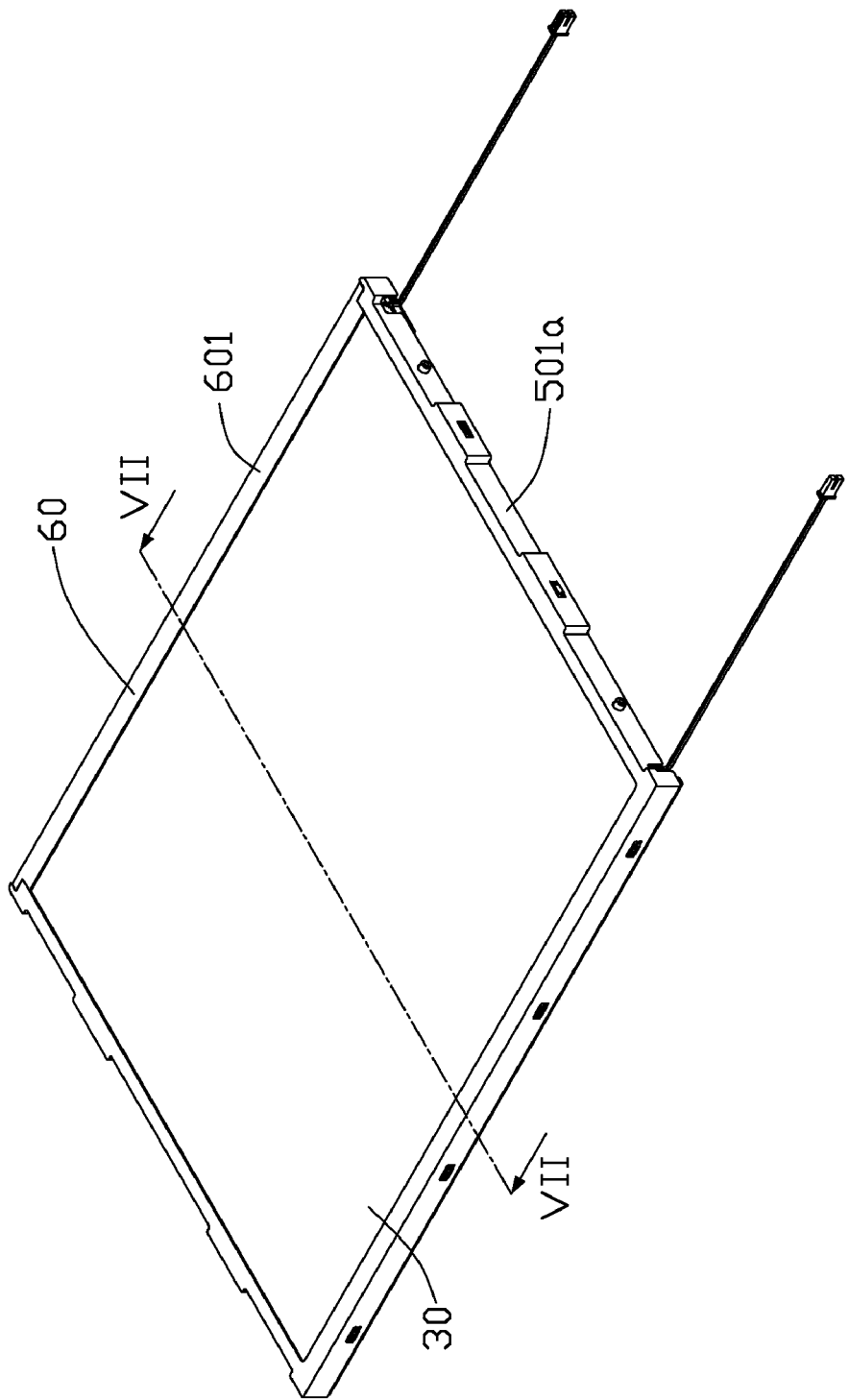
FIG. 5 is an assembled, isometric view of the LCM of FIG. 1.
Figure 6:
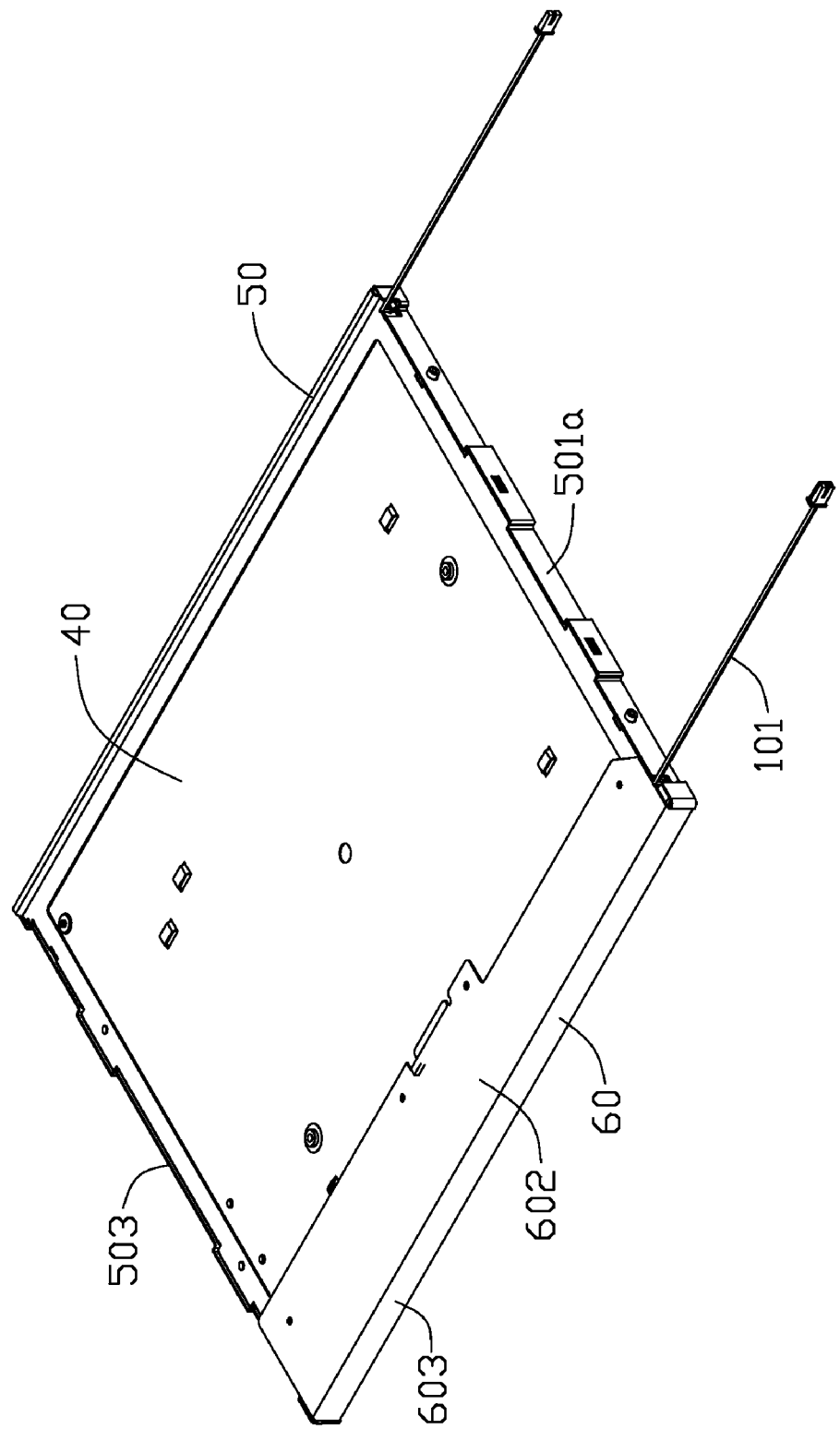
FIG. 6 is similar to FIG. 5, but viewed from the bottom.
Figure 7:
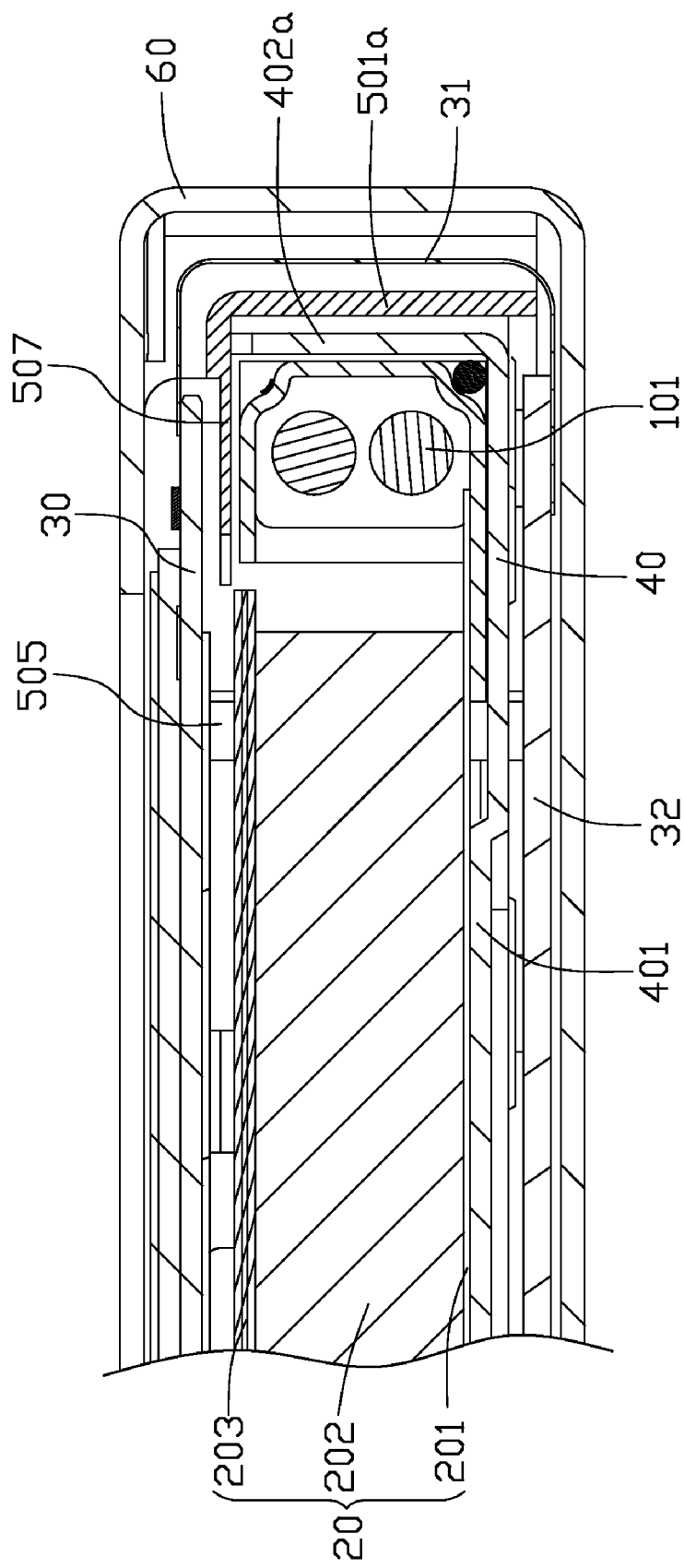
FIG. 7 is a partial, cross-sectional view of the LCM of FIG. 5, taken along a line VII-VII thereof.

Referring to FIGS. 2-4, the upper frame 50 comprises four sidewalls 501a, 501b, 501c, 501d connected to each other, a top flange 503, and a plurality of supporting members 505. Typically, the upper frame 50 is made of plastic material. The upper frame 50 is rectangular in shape, and the four sidewalls 501a, 501b, 501c, and 501d cooperatively form an opening (not labeled). The top flange 503 extends perpendicularly from the three sidewalls 501b, 501c, 501d towards a center (not labeled) of the upper frame 50. In another embodiment, the top flange 503 may extend perpendicularly from all four of the sidewalls 501a, 501b, 501c, and 501d. The plurality of supporting members 505 are defined at inner surfaces (not labeled) of the two sidewalls 501b, 501d that are opposite each other, and adjacent to the top flange 503, such that the top flange 503 and the supporting members 505 cooperatively define a space for receiving the liquid crystal display panel 30. In another embodiment, the supporting members 505 may be defined at inner surfaces (not labeled) of three or all four of the sidewalls 501a, 501b, 501c, and 501d. The liquid crystal display panel 30 is exposed through the opening of the upper frame 50. In one embodiment, the supporting members 505 are planar resilient sheets extending from the sidewalls 501b, 501d. The width of the top flange 503 is larger than that of the supporting members 505. Thus, the liquid crystal display panel 30 can be received into a space 506 between the top flange 503 and the supporting members 505 by pressing the liquid crystal display panel 30 to the upper frame 50 from a side of the supporting members 505.

A distal end surface (not labeled) of each supporting member 505 is a slanted surface. A distance between the top flange 503 and each of the supporting members 505 is substantially equal to or slightly larger than the thickness of the liquid crystal display panel 30. In one alternative embodiment, any one or more of the supporting members 505 may be hooking resilient members. In another alternative embodiment, any one or more of the supporting members 505 may be non-resilient sheets if at least one of the supporting members 505 is resilient.

The upper frame 50 further includes a plurality of holes 5014 defined in the two sidewalls 501a, 501c, for allowing the CCFL 101 to pass therethrough. In the illustrated embodiment, the holes 5014 are through holes. An outer surfaces of the two sidewalls 501a, 501c of the upper frame 50 define a plurality of locking elements 5012 corresponding to the plurality of locking elements 4021 of the two sidewalls 402a, 402c. Thus, the upper frame 50 and the bottom frame 40 can be assembled together to receive the light source units 10, the optical elements 20, and the liquid crystal display panel 30 therein.

Referring to FIG. 4 again, in this embodiment, the sidewall 501a does not define any supporting member 505, and the sidewall 501a is lower than the other three sidewalls 501b, 501c, and 501d. Top surfaces 507 of the sidewalls 501b, 501c, and 501d help to support the liquid crystal display panel 30, and the flexible printed circuit 31 can be slightly bent along the sidewall 501a.

Referring to FIGS. 1 and 5-7, the LCM 100 further includes an edge cover 60 covering the sidewall 501a, protecting the liquid crystal display panel 30, the flexible printed circuit 31, and the printed circuit board 32. The edge cover 60 includes an upper plate 601, a bottom plate 602, and a side plate 603. The upper plate 601 extends from a top (not labeled) of the side plate 603 towards the center (not labeled) of the LCM 100, and the bottom plate 602 extends from a bottom (not labeled) of the side plate 603 towards the center of the LCM 100. The upper plate 601 is mounted on the top of the sidewall 501a. The size of the bottom plate 602 is larger than that of the upper plate 601 to completely cover the printed circuit board 32. The edge cover 60 may further include an anti-EMI coating (anti-electromagnetic interference coating, not labeled) on an inner surface thereof, for protecting the flexible printed circuit 31 and the printed circuit board 32.

Referring to FIGS. 1 and 4 again, top surfaces of the two sidewalls 501b, 501d adjacent to the two ends of the sidewall 501a define two depressions 5013. Two ends of the upper plate 601 define two cutouts 6011, one at each end, corresponding to the depressions 5013. When the edge cover 60 is assembled with the upper frame 50, the two cutouts 6011 fit in the depressions 5013 of the upper frame 50.

The LCM 100 is assembled by positioning the light source units 10 and the optical elements 20 on the base 401 in order. The liquid crystal display panel 30 is mounted into the space 506 between the top flange 503 and the supporting members 505 of the upper frame 50. The upper frame 50 assembled with the liquid crystal display panel 30 is attached to the bottom frame 40 via the plurality of locking elements 4021, 5012 to hold the light source units 10 and the optical elements 20 tightly in place. The flexible printed circuit 31, connected on one end to the liquid crystal display panel 30, is wrapped across the top surface of the sidewall 501a, to connect to the printed circuit board 32. Then the edge cover 60 is attached to the upper frame 50 and the bottom frame 40, covering a portion of the bottom frame 40, a portion of the upper frame 50, and the printed circuit board 32.

It is to be understood that even though numerous characteristics and advantages of the present embodiments have been set forth in the foregoing description, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:
1. A liquid crystal display module, comprising:
   a liquid crystal display panel,
   a bottom frame,
   a backlight unit positioned on the bottom frame,
   an upper frame assembled on the bottom frame thereby fixing the backlight unit on the bottom frame, the upper frame comprising a plurality of sidewalls, a top flange extending substantially from at least two opposite sidewalls of the plurality of sidewalls towards a center of the upper frame, and a plurality of supporting members defined at inner surfaces of the plurality of sidewalls adjacent to the top flange, wherein at least one of the plurality of supporting members is resilient, and the liquid crystal display panel is fixed between the top flange and the supporting members, the upper frame is rectangular in shape and includes four sidewalls forming an opening, one of the four sidewalls is lower than the other three sidewalls, and does not have supporting members.

2. The liquid crystal display module according to claim 1, further comprising an edge cover covering the lower sidewall thereby protecting the liquid crystal display panel, the edge cover including a side plate, an upper plate extending from a top of the side plate towards a center of the liquid crystal display module, and the bottom plate extending from a bottom of the side plate towards the center of the liquid crystal display module.

3. The liquid crystal display module according to claim 2, wherein the edge cover further comprises an anti-electromagnetic interference (anti-EMI) coating on an inner surface.

4. The liquid crystal display module according to claim 1, wherein the plurality of supporting members are selected from the group consisting of at least one planar sheet and at least one hooking structure.

5. The liquid crystal display module according to claim 4, wherein a distal end surface of each of the plurality of supporting members is a slanted surface.

6. The liquid crystal display module according to claim 1, wherein a distance between the top flange and the corresponding supporting member is substantially equal to or slightly larger than the thickness of the liquid crystal display panel.

7. The liquid crystal display module according to claim 1, wherein the bottom frame comprises a base and four sidewalls extending from four edges of the base, the four sidewalls being spaced apart from each other at the corners of the bottom frame.

8. The liquid crystal display module according to claim 1, wherein the backlight unit comprises a plurality of light source units and at least one optical element.

9. The liquid crystal display module according to claim 8, wherein each of the plurality of light source units comprises a cold cathode fluorescent lamp, a reflector, and a lead wire, the reflector surrounding the cold cathode fluorescent lamp, the lead wire electrically connected to an electrode of the cold cathode fluorescent lamp.

10. The liquid crystal display module according to claim 8, wherein the at least one optical element is a plurality of optical elements, which comprise a light reflective sheet positioned on the base of the bottom frame, followed by a light guide plate above the light reflective sheet, and an optical film above the light guide plate.

11. A method for assembling a liquid crystal display module, the method comprising:
providing a backlight unit, a liquid crystal display panel, a bottom frame, and a rectangular upper frame, the upper frame including four sidewalls, a top flange extending around from at least two opposite sidewalls of the plurality of sidewalls towards a center of the upper frame, a plurality of supporting members defined at inner surfaces of the plurality of sidewalls adjacent to the top flange, and one of the four sidewalls being lower than the other three sidewalls and having no supporting member;
fixing the backlight unit on the bottom frame;
pressing the liquid crystal display panel into a space between the top flange and the supporting elements of the upper frame; and
mounting the upper frame with the liquid crystal display panel onto the bottom frame, securing the backlight unit in position.

12. The method for assembling a liquid crystal display module according to claim 11, wherein at least one of the supporting members is resilient.

13. The method for assembling a liquid crystal display module according to claim 11, wherein the supporting members are selected from the group consisting of at least one planar sheet and at least one hooking structure.

14. The method for assembling a liquid crystal display module according to claim 11, wherein a distal end surface of each of the plurality of supporting members is a slanted surface.

15. The method for assembling a liquid crystal display module according to claim 11, wherein a distance between the top flange and each of the supporting members is substantially equal to or slightly larger than the thickness of the liquid crystal display panel.

* * * * *